(12) United States Patent
Lund et al.

(10) Patent No.: US 8,713,420 B2
(45) Date of Patent: Apr. 29, 2014

(54) SYNCHRONIZATION OF WEB APPLICATIONS AND MEDIA

(75) Inventors: Robert M. Lund, Boulder, CO (US); Eric Winkelman, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 90 days.

(21) Appl. No.: 13/173,312

(22) Filed: Jun. 30, 2011

(65) Prior Publication Data
US 2013/0007576 A1 Jan. 3, 2013

(51) Int. Cl.
*G06F 17/00* (2006.01)

(52) U.S. Cl.
USPC ............................................... 715/203

(58) Field of Classification Search
CPC ........................................ G06F 17/00
USPC ............................................... 715/203
See application file for complete search history.

(56) References Cited

U.S. PATENT DOCUMENTS

| 7,072,908 | B2* | 7/2006 | Dideriksen et al. | 1/1 |
| 2008/0177630 | A1* | 7/2008 | Maghfourian et al. | 705/14 |
| 2009/0274437 | A1* | 11/2009 | Stiers et al. | 386/95 |
| 2010/0251120 | A1* | 9/2010 | Chelba | 715/719 |
| 2010/0281107 | A1* | 11/2010 | Fallows et al. | 709/203 |
| 2012/0078899 | A1* | 3/2012 | Fontana et al. | 707/736 |
| 2012/0079380 | A1* | 3/2012 | Tsai et al. | 715/716 |
| 2012/0124123 | A1* | 5/2012 | Pierce et al. | 709/203 |
| 2012/0254454 | A1* | 10/2012 | Margush et al. | 709/231 |

OTHER PUBLICATIONS

Silvia Pfeiffer, The Definitive Guide to HTML5 Video, Dec. 27, 2010, Apress, Chapter 9 section 9.3.*
W3C, User Agent Accessibility Guidelines (UAAG) 2.0, <http://web.archive.org/web/20100204093922/http://www.w3.org/TR/UAAG20/>, Jul. 23, 2009.*

* cited by examiner

*Primary Examiner* — Cesar Paula
*Assistant Examiner* — Mohammed-Ibrahim Zuberi
(74) *Attorney, Agent, or Firm* — Great Lakes Intellectual Property, PLLC.

(57) ABSTRACT

A method to facilitate synchronizing web applications with media playing within a web browser while rendering a web page. The synchronization allowing web applications to be executed during play of IP transmitted media without the web browser having to pre-load the web applications or re-load the web page.

20 Claims, 2 Drawing Sheets

SYNCHRONIZATION OF WEB APPLICATIONS AND MEDIA

TECHNICAL FIELD

The present invention relates to synchronizing web browser-based applications to media showing within a web browser, such as but not limited to synchronizing enhanced television (ETV), dynamic advertisement insertion, and other application activities while the web browser is showing a streamed media program.

BACKGROUND

The World Wide Web Consortium (W3C) is an international community where member organizations, a full-time staff, and the public work together to develop web standards. Hypertext Markup Language version 5 (HTML5) is one of the Web standards associated with the W3C. A persistent draft of the HTML5 standard is identified as http://www.w3.org/TR/2011/WD-html5-20110525/, the disclosure of which is hereby in corporate by reference in its entirety.

Section 4.8.10.12—Timed Text Tracks—of the noted HTML5 standard states:

I. 4.8.10.12.1 Text Track Model

A media element can have a group of associated text tracks, known as the media element's list of text tracks. The text tracks are sorted as follows:

1. The text tracks corresponding to track element children of the media element, in tree order.
2. Any text tracks added using the addTextTrack( ) method, in the order they were added, oldest first.
3. Any media-resource-specific text tracks (text tracks corresponding to data in the media resource), in the order defined by the media resource's format specification.

A text track consists of:

The kind of text track
  This decides how the track is handled by the user agent. The kind is represented by a string. The possible strings are:
    subtitles
    captions
    descriptions
    chapters
    metadata
  The kind of track can change dynamically, in the case of a text track corresponding to a track element.
A label
  This is a human-readable string intended to identify the track for the user. In certain cases, the label might be generated automatically.
  The label of a track can change dynamically, in the case of a text track corresponding to a track element or in the case of an automatically-generated label whose value depends on variable factors such as the user's preferred user interface language.
A language
  This is a string (a BCP 47 language tag) representing the language of the text track's cues. [BCP47]
  The language of a text track can change dynamically, in the case of a text track corresponding to a track element.
A Readiness State
  One of the following:
  Not Loaded
    Indicates that the text track is known to exist (e.g. it has been declared with a track element), but its cues have not been obtained.
  Loading
    Indicates that the text track is loading and there have been no fatal errors encountered so far. Further cues might still be added to the track.
  Loaded
    Indicates that the text track has been loaded with no fatal errors. No new cues will be added to the track except if the text track corresponds to a MutableTextTrack object.
  Failed to Load
    Indicates that the text track was enabled, but when the user agent attempted to obtain it, this failed in some way (e.g. URL could not be resolved, network error, unknown text track format). Some or all of the cues are likely missing and will not be obtained.
  The readiness state of a text track changes dynamically as the track is obtained.
A mode
  One of the following:
  Disabled
    Indicates that the text track is not active. Other than for the purposes of exposing the track in the DOM, the user agent is ignoring the text track. No cues are active, no events are fired, and the user agent will not attempt to obtain the track's cues.
  Hidden
    Indicates that the text track is active, but that the user agent is not actively displaying the cues. If no attempt has yet been made to obtain the track's cues, the user agent will perform such an attempt momentarily. The user agent is maintaining a list of which cues are active, and events are being fired accordingly.
  Showing
  Showing by Default
    Indicates that the text track is active. If no attempt has yet been made to obtain the track's cues, the user agent will perform such an attempt momentarily. The user agent is maintaining a list of which cues are active, and events are being fired accordingly. In addition, for text tracks whose kind is subtitles or captions, the cues are being displayed over the video as appropriate; for text tracks whose kind is descriptions, the user agent is making the cues available to the user in a non-visual fashion; and for text tracks whose kind is chapters, the user agent is making available to the user a mechanism by which the user can navigate to any point in the media resource by selecting a cue.
  The showing by default state is used in conjunction with the default attribute on track elements to indicate that the text track was enabled due to that attribute. This allows the user agent to override the state if a later track is discovered that is more appropriate per the user's preferences.
A List of Zero or More Cues
  A list of text track cues, along with rules for updating the text track rendering.
  The list of cues of a text track can change dynamically, either because the text track has not yet been loaded or is still loading, or because the text track corresponds to a MutableTextTrack object, whose API allows individual cues can be added or removed dynamically.
  Each text track has a corresponding TextTrack object.
  The text tracks of a media element are ready if all the text tracks whose mode was not in the disabled state when the element's resource selection algorithm last started now have a text track readiness state of loaded or failed to load.

A text track cue is the unit of time-sensitive data in a text track, corresponding for instance for subtitles and captions to the text that appears at a particular time and disappears at another time.

Each text track cue consists of:

An Identifier
    An arbitrary string.
A Start Time
    A time, in seconds and fractions of a second, at which the cue becomes relevant.
An End Time
    A time, in seconds and fractions of a second, at which the cue stops being relevant.
A Pause-on-exit Flag
    A boolean indicating whether playback of the media resource is to pause when the cue stops being relevant.
A Writing Direction
    A writing direction, either horizontal (a line extends horizontally and is positioned vertically, with consecutive lines displayed below each other), vertical growing left (a line extends vertically and is positioned horizontally, with consecutive lines displayed to the left of each other), or vertical growing right (a line extends vertically and is positioned horizontally, with consecutive lines displayed to the right of each other).
A Size
    A number giving the size of the box within which the text of each line of the cue is to be aligned, to be interpreted as a percentage of the video, as defined by the writing direction.
The Text of the Cue
    The raw text of the cue, and rules for its interpretation, allowing the text to be rendered and converted to a DOM fragment.

A text track cue is immutable.

Each text track cue has a corresponding TextTrackCue object, and can be associated with a particular text track. Once a text track cue is associated with a particular text track, the association is permanent.

In addition, each text track cue has two pieces of dynamic information:

The Active Flag
    This flag must be initially unset. The flag is used to ensure events are fired appropriately when the cue becomes active or inactive, and to make sure the right cues are rendered.
    The user agent must synchronously unset this flag whenever the text track cue is removed from its text track's text track list of cues; whenever the text track itself is removed from its media element's list of text tracks or has its text track mode changed to disabled; and whenever the media element's readyState is changed back to HAVE NOTHING. When the flag is unset in this way for one or more cues in text tracks that were showing or showing by default prior to the relevant incident, the user agent must, after having unset the flag for all the affected cues, apply the rules for updating the text track rendering of those text tracks.
The Display State
    This is used as part of the rendering model, to keep cues in a consistent position. It must initially be empty. Whenever the text track cue active flag is unset, the user agent must empty the text track cue display state.

The text track cues of a media element's text tracks are ordered relative to each other in the text track cue order, which is determined as follows: first group the cues by their text track, with the groups being sorted in the same order as their text tracks appear in the media element's list of text tracks; then, within each group, cues must be sorted by their start time, earliest first; then, any cues with the same start time must be sorted by their end time, earliest first; and finally, any cues with identical end times must be sorted in the order they were created (so e.g. for cues from a WebVTT file, that would be the order in which the cues were listed in the file).

II. 4.8.10.12.2 Sourcing In-band Text Tracks

A media-resource-specific text track is a text track that corresponds to data found in the media resource.

Rules for processing and rendering such data are defined by the relevant specifications, e.g. the specification of the video format if the media resource is a video.

When a media resource contains data that the user agent recognises and supports as being equivalent to a text track, the user agent runs the steps to expose a media-resource-specific text track with the relevant data, as follows:

1. Associate the relevant data with a new text track and its corresponding new TextTrack object. The text track is a media-resource-specific text track.
2. Set the new text track's kind, label, and language based on the semantics of the relevant data, as defined by the relevant specification.
3. Populate the new text track's list of cues with the cues parsed so far, following the guidelines for exposing cues, and begin updating it dynamically as necessary.
4. Set the new text track's readiness state to the value that most correctly describes the current state, and begin updating it dynamically as necessary.
    For example, if the relevant data in the media resource has been fully parsed and completely describes the cues, then the text track would be loaded. On the other hand, if the data for the cues is interleaved with the media data, and the media resource as a whole is still being downloaded, then the loading state might be more accurate.
5. Set the new text track's mode to the mode consistent with the user's preferences and the requirements of the relevant specification for the data.
6. Leave the text track list of cues empty, and associate with it the rules for updating the text track rendering appropriate for the format in question.
7. Add the new text track to the media element's list of text tracks.

When a media element is to forget the media element's media-resource-specific text tracks, the user agent must remove from the media element's list of text tracks all the media-resource-specific text tracks.

III. 4.8.10.12.3 Sourcing Out-of-band Text Tracks

When a track element is created, it must be associated with a new text track (with its value set as defined below) and its corresponding new TextTrack object.

The text track kind is determined from the state of the element's kind attribute according to the following table; for a state given in a cell of the first column, the kind is the string given in the second column:

| State | String |
|---|---|
| Subtitles | subtitles |
| Captions | captions |
| Descriptions | descriptions |
| Chapters | chapters |
| Metadata | metadata |

The text track label is the element's track label.

The text track language is the element's track language, if any, or the empty string otherwise.

As the kind, label, and srclang attributes are set, changed, or removed, the text track must update accordingly, as per the definitions above.

Changes to the track URL are handled in the algorithm below.

The text track list of cues is initially empty. It is dynamically modified when the referenced file is parsed. Associated with the list are the rules for updating the text track rendering appropriate for the format in question; for WebVTT, this is the rules for updating the display of WebVTT text tracks.

When a track element's parent element changes and the new parent is a media element, then the user agent must add the track element's corresponding text track to the media element's list of text tracks.

When a track element's parent element changes and the old parent was a media element, then the user agent must remove the track element's corresponding text track from the media element's list of text tracks.

When a text track corresponding to a track element is added to a media element's list of text tracks, the user agent must set the text track mode appropriately, as determined by the following conditions:

If the text track kind is subtitles or captions and the user has indicated an interest in having a track with this text track kind, text track language, and text track label enabled, and there is no other text track in the media element's list of text tracks with a text track kind of either subtitles or captions whose text track mode is showing If the text track kind is descriptions and the user has indicated an interest in having text descriptions with this text track language and text track label enabled, and there is no other text track in the media element's list of text tracks with a text track kind of descriptions whose text track mode is showing If the text track kind is chapters and the text track language is one that the user agent has reason to believe is appropriate for the user, and there is no other text track in the media element's list of text tracks with a text track kind of chapters whose text track mode is showing Let the text track mode be showing.

If there is a text track in the media element's list of text tracks whose text track mode is showing by default, the user agent must furthermore change that text track's text track mode to hidden.

If the track element has a default attribute specified, and there is no other text track in the media element's list of text tracks whose text track mode is showing or showing by default Let the text track mode be showing by default.
Otherwise
Let the text track mode be disabled.

When a text track corresponding to a track element is created with text track mode set to hidden, showing, or showing by default, and when a text track corresponding to a track element is created with text track mode set to disabled and subsequently changes its text track mode to hidden, showing, or showing by default for the first time, the user agent must immediately and synchronously run the following algorithm. This algorithm interacts closely with the event loop mechanism; in particular, it has a synchronous section (which is triggered as part of the event loop algorithm). The step in that section is marked with 1.

1. Set the text track readiness state to loading.
2. Let URL be the track URL of the track element.
3. Asynchronously run the remaining steps, while continuing with whatever task was responsible for creating the text track or changing the text track mode.
4. Download: If URL is not the empty string, and its origin is the same as the media element's Document's origin, then fetch URL, from the media element's Document's origin, with the force same-origin flag set.

The tasks queued by the fetching algorithm on the networking task source to process the data as it is being fetched must examine the resource's Content Type metadata, once it is available, if it ever is. If no Content Type metadata is ever available, or if the type is not recognised as a text track format, then the resource's format must be assumed to be unsupported (this causes the load to fail, as described below). If a type is obtained, and represents a supported text track format, then the resource's data must be passed to the appropriate parser as it is received, with the text track list of cues being used for that parser's output.

If the fetching algorithm fails for any reason (network error, the server returns an error code, a cross-origin check fails, etc), or if URL is the empty string or has the wrong origin as determined by the condition at the start of this step, or if the fetched resource is not in a supported format, then queue a task to first change the text track readiness state to failed to load and then fire a simple event named error at the track element; and then, once that task is queued, move on to the step below labeled monitoring.

If the fetching algorithm does not fail, then, when it completes, queue a task to first change the text track readiness state to loaded and then fire a simple event named load at the track element; and then, once that task is queued, move on to the step below labeled monitoring.

If, while the fetching algorithm is active, either:
the track URL changes so that it is no longer equal to URL, while the text track mode is set to hidden, showing, or showing by default; or
the text track mode changes to hidden, showing, or showing by default, while the track URL is not equal to URL . . . then the user agent must run the following steps:
3. Abort the fetching algorithm.
4. Queue a task to fire a simple event named abort at the track element.
5. Let URL be the new track URL.
6. Jump back to the top of the step labeled download.

Until one of the above circumstances occurs, the user agent must remain on this step.

5. Monitoring: Wait until the track URL is no longer equal to URL, at the same time as the text track mode is set to hidden, showing, or showing by default.
6. Wait until the text track readiness state is no longer set to loading.
7. Await a stable state. The synchronous section consists of the following step. (The step in the synchronous section is marked with $\bar{x}$.)
8. $\bar{x}$ Set the text track readiness state to loading.
9. End the synchronous section, continuing the remaining steps asynchronously.
10. Jump to the step labeled download.

IV. 4.8.10.12.4 Text Track API
media.textTracks.length
Returns the number of text tracks associated with the media element (e.g. from track elements). This is the number of text tracks in the media element's list of text tracks.

media.textTracks [n]
   Returns the TextTrack object representing the nth text track in the media element's list of text tracks.
track.track
   Returns the TextTrack object representing the track element's text track.

The textTracks attribute of media elements must return an array host object for objects of type TextTrack that is fixed length and read only. The same object must be returned each time the attribute is accessed. [WEBIDL]

The array must contain the TextTrack objects of the text tracks in the media element's list of text tracks, in the same order as in the list of text tracks.

```
interface TextTrack {
   readonly attribute DOMString kind;
   readonly attribute DOMString label;
   readonly attribute DOMString language;
   const unsigned short NONE = 0;
   const unsigned short LOADING = 1;
   const unsigned short LOADED = 2;
   const unsigned short ERROR = 3;
   readonly attribute unsigned short readyState;
         attribute Function onload;
         attribute Function onerror;
   const unsigned short OFF = 0;
   const unsigned short HIDDEN = 1;
   const unsigned short SHOWING = 2;
         attribute unsigned short mode;
   readonly attribute TextTrackCueList cues;
   readonly attribute TextTrackCueList activeCues;
         attribute Function oncuechange;
};
TextTrack implements EventTarget;
``` textTrack.kind
   Returns the text track kind string.
textTrack.label
   Returns the text track label.
textTrack.language
   Returns the text track language string.
textTrack.readyState
   Returns the text track readiness state, represented by a number from the following list:
   TextTrack.NONE (0)
   The text track not loaded state.
   TextTrack.LOADING (1)
   The text track loading state.
   TextTrack.LOADED (2)
   The text track loaded state.
   TextTrack.ERROR (3)
   The text track failed to load state.
textTrack.mode
   Returns the text track mode, represented by a number from the following list:
   TextTrack.OFF (0)
   The text track disabled mode.
   TextTrack.HIDDEN (1)
   The text track hidden mode.
   TextTrack.SHOWING (2)
   The text track showing and showing by default modes.
   Can be set, to change the mode.
textTrack.cues
   Returns the text track list of cues, as a TextTrackCueList object.
textTrack.activeCues
   Returns the text track cues from the text track list of cues that are currently active (i.e. that start before the current playback position and end after it), as a TextTrackCueList object.

The kind attribute must return the text track kind of the text track that the TextTrack object represents.

The label attribute must return the text track label of the text track that the TextTrack object represents.

The language attribute must return the text track language of the text track that the TextTrack object represents.

The readyState attribute must return the numeric value corresponding to the text track readiness state of the text track that the TextTrack object represents, as defined by the following list:
NONE (numeric value 0)
   The text track not loaded state.
LOADING (numeric value 1)
   The text track loading state.
LOADED (numeric value 2)
   The text track loaded state.
ERROR (numeric value 3)
   The text track failed to load state.

The mode attribute, on getting, must return the numeric value corresponding to the text track mode of the text track that the TextTrack object represents, as defined by the following list:
OFF (numeric value 0)
   The text track disabled mode.
HIDDEN (numeric value 1)
   The text track hidden mode.
SHOWING (numeric value 2)
   The text track showing and showing by default modes.

On setting, if the new value is not either 0, 1, or 2, the user agent must throw an INVALID ACCESS ERR exception. Otherwise, if the new value isn't equal to what the attribute would currently return, the new value must be processed as follows:
   If the new value is 0
   Set the text track mode of the text track that the TextTrack object represents to the text track disabled mode.
   If the new value is 1
   Set the text track mode of the text track that the TextTrack object represents to the text track hidden mode.
   If the new value is 2
   Set the text track mode of the text track that the TextTrack object represents to the text track showing mode.
   If the mode had been showing by default, this will change it to showing, even though the value of mode would appear not to change.

If the text track mode of the text track that the TextTrack object represents is not the text track disabled mode, then the cues attribute must return a live TextTrackCueList object that represents the subset of the text track list of cues of the text track that the TextTrack object represents whose start times occur before the earliest possible position when the script started, in text track cue order. Otherwise, it must return null. When an object is returned, the same object must be returned each time.

The earliest possible position when the script started is whatever the earliest possible position was the last time the event loop reached step 1.

If the text track mode of the text track that the TextTrack object represents is not the text track disabled mode, then the activeCues attribute must return a live TextTrackCueList object that represents the subset of the text track list of cues of the text track that the TextTrack object represents whose active flag was set when the script started, in text track cue order. Otherwise, it must return null. When an object is returned, the same object must be returned each time.

A text track cue's active flag was set when the script started if its text track cue active flag was set the last time the event loop reached step 1.

```
interface MutableTextTrack : TextTrack {
    void addCue(in TextTrackCue cue);
    void removeCue(in TextTrackCue cue);
};
``` mutableTextTrack=media.addTextTrack(kind [, label [, language]])

Creates and returns a new MutableTextTrack object, which is also added to the media element's list of text tracks.

mutableTextTrack.addCue(cue)

Adds the given cue to mutableTextTrack's text track list of cues.

Raises an exception if the argument is null, associated with another text track, or already in the list of cues.

mutableTextTrack.removeCue(cue)

Removes the given cue from mutableTextTrack's text track list of cues.

Raises an exception if the argument is null, associated with another text track, or not in the list of cues.

The addTextTrack (kind, label, language) method of media elements, when invoked, must run the following steps:

1. If kind is not one of the following strings, then throw a SYNTAX ERR exception and abort these steps:
   subtitles
   captions
   descriptions
   chapters
   metadata
2. If the label argument was omitted, let label be the empty string.
3. If the language argument was omitted, let language be the empty string.
4. Create a new text track, and set its text track kind to kind, its text track label to label, its text track language to language, its text track readiness state to the text track loaded state, its text track mode to the text track hidden mode, and its text track list of cues to an empty list.
5. Add the new text track to the media element's list of text tracks.

The addCue(cue) method of MutableTextTrack objects, when invoked, must run the following steps:

1. If cue is null, then throw an INVALID ACCESS ERR exception and abort these steps.
2. If the given cue is already associated with a text track other than the method's MutableTextTrack object's text track, then throw an INVALID STATE ERR exception and abort these steps.
3. Associate cue with the method's MutableTextTrack object's text track, if it is not currently associated with a text track.
4. If the given cue is already listed in the method's MutableTextTrack object's text track's text track list of cues, then throw an INVALID STATE ERR exception.
5. Add cue to the method's MutableTextTrack object's text track's text track list of cues.

The removeCue(cue) method of MutableTextTrack objects, when invoked, must run the following steps:

1. If cue is null, then throw an INVALID ACCESS ERR exception and abort these steps.
2. If the given cue is not associated with the method's MutableTextTrack object's text track, then throw an INVALID STATE ERR exception.
3. If the given cue is not currently listed in the method's MutableTextTrack object's text track's text track list of cues, then throw a NOT FOUND ERR exception.
4. Remove cue from the method's MutableTextTrack object's text track's text track list of cues.

In this example, an audio element is used to play a specific sound-effect from a sound file containing many sound effects. A cue is used to pause the audio, so that it ends exactly at the end of the clip, even if the browser is busy running some script. If the page had relied on script to pause the audio, then the start of the next clip might be heard if the browser was not able to run the script at the exact time specified.

```
var sfx = new Audio('sfx.wav');
var sounds = a.addTextTrack('metadata');
// add sounds we care about
sounds.addCue(new TextTrackCue('dog bark', 12.783, 13.612, ' ', ' ',
  ' ', true));
sounds.addCue(new TextTrackCue('kitten mew', 13.612, 15.091, ' ',
  ' ', ' ', true));
function playSound(id) {
    sfx.currentTime = sounds.getCueById(id).startTime;
    sfx.play( );
}
sfx.oncanplaythrough = function ( ) {
    playSound('dog bark');
}
window.onbeforeunload = function ( ) {
    playSound('kitten mew');
    return 'Are you sure you want to leave this awesome page?';
}
interface TextTrackCueList {
    readonly attribute unsigned long length;
    getter TextTrackCue (in unsigned long index);
    TextTrackCue getCueById(in DOMString id);
};
``` cuelist.length
    Returns the number of cues in the list.

cuelist[index]
    Returns the text track cue with index index in the list. The cues are sorted in text track cue order.

cuelist.getCueById(id)
    Returns the first text track cue (in text track cue order) with text track cue identifier id.
    Returns null if none of the cues have the given identifier or if the argument is the empty string.

A TextTrackCueList object represents a dynamically updating list of text track cues in a given order.

The length attribute must return the number of cues in the list represented by the TextTrackCueList object.

The supported property indicies of a TextTrackCueList object at any instant are the numbers from zero to the number of cues in the list represented by the TextTrackCueList object minus one, if any. If there are no cues in the list, there are no supported property indicies.

To determine the value of an indexed property for a given index index, the user agent must return the indexth text track cue in the list represented by the TextTrackCueList object.

The getCueById(id) method, when called with an argument other than the empty string, must return the first text track cue in the list represented by the TextTrackCueList object whose text track cue identifier is id, if any, or null otherwise. If the argument is the empty string, then the method must return null.

```
interface TextTrackCue {
    readonly attribute TextTrack track;
    readonly attribute DOMString id;
    readonly attribute double startTime;
    readonly attribute double endTime;
    readonly attribute boolean pauseOnExit;
    DOMString getCueAsSource( );
    DocumentFragment getCueAsHTML( );
        attribute Function onenter;
        attribute Function onexit;
};
TextTrackCue implements EventTarget;
``` cue.track
   Returns the TextTrack object to which this text track cue belongs, if any, or null otherwise.
cue.id
   Returns the text track cue identifier.
cue.startTime
   Returns the text track cue start time, in seconds.
cue.endTime
   Returns the text track cue end time, in seconds.
cue.pauseOnExit
   Returns true if the text track cue pause-on-exit flag is set, false otherwise.
source=cue.getCueAsSource( )
   Returns the text track cue text in raw unparsed form.
fragment=cue.getCueAsHTML( )
   Returns the text track cue text as a DocumentFragment of HTML elements and other DOM nodes.

The track attribute must return the TextTrack object of the text track with which the text track cue that the TextTrackCue object represents is associated, if any; or null otherwise.

The id attribute must return the text track cue identifier of the text track cue that the TextTrackCue object represents.

The startTime attribute must return the text track cue start time of the text track cue that the TextTrackCue object represents, in seconds.

The endTime attribute must return the text track cue end time of the text track cue that the TextTrackCue object represents, in seconds.

The pauseOnExit attribute must return true if the text track cue pause-on-exit flag of the text track cue that the TextTrackCue object represents is set; or false otherwise.

The direction attribute must return the text track cue writing direction of the text track cue that the TextTrackCue object represents.

The getCueAsSource( ) method must return the raw text track cue text.

The getCueAsHTML( ) method must convert the text track cue text to a DocumentFragment for the media element's Document, using the appropriate rules for doing so.

V. 4.8.10.12.5 Event Definitions

The following are the event handlers that must be supported, as IDL attributes, by all objects implementing the TextTrack interface:

| Event handler | Event handler event type |
|---|---|
| onload | load |
| onerror | error |
| oncuechange | cuechange |

The following are the event handlers that must be supported, as IDL attributes, by all objects implementing the TextTrackCue interface:

| Event handler | Event handler event type |
|---|---|
| onenter | enter |
| onexit | exit |

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
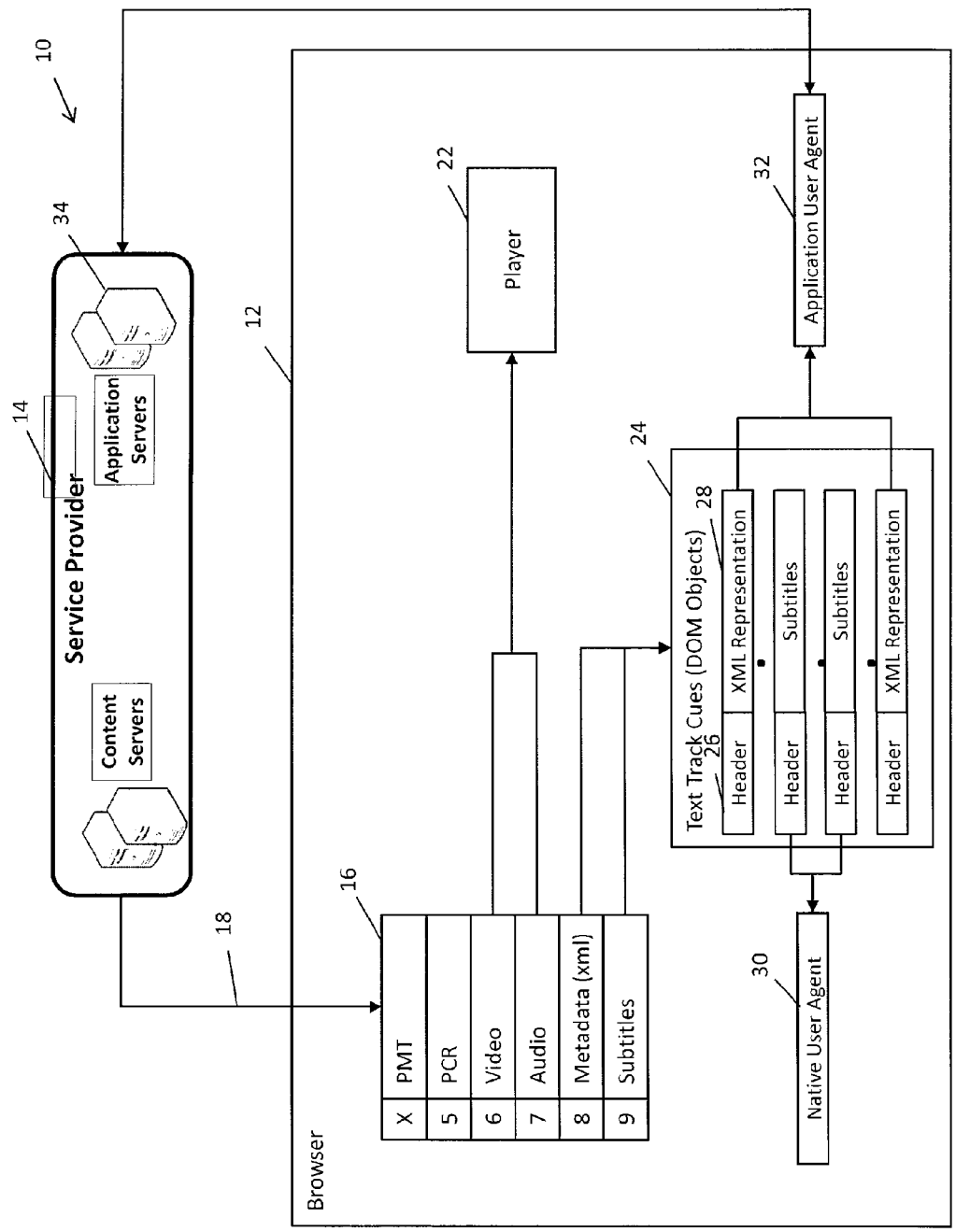
FIG. 1 illustrates a system for synchronizing web applications in accordance with one non-limiting aspect of the present invention.

FIG. 1 illustrates a system 10 for synchronizing web applications to media showing within a web browser 12 of a client device in accordance with one non-limiting aspect of the present invention. The system 10 is predominately described for exemplary non-limiting purposes with respect to facilitating synchronization necessary to support enhanced television (ETV) and/or dynamic advertisement insertion activities while the web browser 12 is showing a streamed media program, e.g., a movie, a television program, a video or an audio program streamed to a client device according to Movie Pictures Expert Group (MPEG) or some other suitable transport protocol. The present invention, however, fully contemplates synchronizing other types of applications/operations relative to playback of the media and not just applications/operations associated with ETV and/or dynamic advertisement insertion.

A service provider 14 may be configured to source the media program to the browser 12 within a signaling/transport stream 16 carried over a network 18. The service provider 12 may be associated with a multiple system operator (MSO), a cable/broadcast/satellite television service provider, a mobile/cellular phone service provider, a high-speed data/internet service provider, etc. The network 18 may be any wireline or wireless network suitable to facilitating transport of the media. Optionally, the media may be downloaded or otherwise file-transported (disc, flash drive, etc.) to the client device without requiring transport over the transport network and/or a portion of the media may be transported over the network 18 and a portion may be transported through file-transfer, e.g., the messaging relied upon to facilitate synchronization may be transported through the network and the video/audio of the media may be separately transported, which may facilitate synchronizing browser applications for media transported without in-band synchronization data.

While the transport stream 16 may be otherwise formatted, the transport stream 16 is shown to include a program map table (PMT), a program clocks reference (PCR), video, audio, a metadata text track, and a subtitles text track. The transport stream may include multiple data types that may be used for synchronization; however, one non-limiting aspect of the present invention particularly contemplates relying specifically on the in-band synchronization data corresponding with text track data. The text track data may be added by the service provider 14 to the transport stream 16 prior to its transmission to facilitate the operations contemplated herein. For exemplary purposes, the transport stream 16 is shown to include the illustrated metadata and subtitles text tracks. Although not shown, the captions, descriptions, and chapters kind text tracks data may also be included as part of the in-band synchronization data. The PMT data may be used by the browser to facilitate filtering the PCR, video, audio, metadata text track, and subtitles text track.

The browser 12 may include a player 22 or other application/plug-in/native capability to facilitate output of the audio and video to an associated user, such as after loading a corresponding webpage. The browser 12 may be HTML5 compliant such that it is capable of facilitating generation of text track cues 24 according to the kind of text track data identified within the transport stream 16. Since the transport stream 16 is shown to only include data for metadata and subtitle text tracks, only the corresponding text track cues 24 are shown, however, any other text track cues 24 would be similarly created and organized. The browser 12 and/or a client processor (not shown) may rely on the PCR data to facilitate timing playback of the audio/media and other operations related thereto, i.e., synchronizing execution of the text track cues 14 generated from the text track data included with the transport stream 16. The browser 12 may include a rendering element (not shown) to facilitate implementing a document object model (DOM), application program interfaces (not shown), and/or other features necessary to synchronize the web applications.

The browser 12 may generate the text track cues 24 to include a header portion 26 and a payload portion 28 in accordance with the requirements of the HTML5 specification noted above. The data used to populate the header and payload portions 26, 28 may be derived from the corresponding information included in the transport stream 16. The header portions 26 may be configured to include an identifier, a start time, an end time, a pause-on-exit flag, a writing direction, and a size (see HTML5 specification). The payload portions 28 may be populated with the text of the cue data embedded in the transport stream of each transported text track. The subtitles text track payload 28 corresponds with the human-understandable text to be shown during playback of the media. The metadata text track payload 28 corresponds with a machine-readable representation, shown for exemplary non-limiting purposed to correspond with extensible mark-up language (XML) representation.

The browser 12 may generate the text track cues 24 as DOM elements and announce the creation thereof to corresponding user agents 30, 32. The browser 12 is shown to be supporting an application user agent 32 and a native user agent 30 for exemplary purposes. The native user agent 30 may be part of the browser 12 configured to support browser operations in accordance with HTML5, i.e., it may not need to be separately loaded into the browser 12 even though it is shown separately within FIG. 1. The application user agent 32 may be a webpage that is retrieved, interpreted and rendered by the browser 12 to support ETV, dynamic advertisement insertion, etc. The application user agent 32, for example, may correspond with a Javascript user agent operable in response to the XML representations of the text tracks to facilitate executing corresponding ETV, dynamic advertisement insertion, and other operational tasks.

The application user agent 32 may be operable with the browser 12 and/or client device to facilitate signaling with remotely located application servers 34. The application servers 34 may be associated with web-based services operable to transport advertisements (pop-up, banner ads, etc.), exchange gaming related signaling, facilitate construction of VOD and/or unicast transmission, facilitate switch video broadcast (SVB) communications, and other interactive or web-based applications. The corresponding messaging, data, code and/or programming necessary to implement the operations associated with the applications (collectively referred to as web applications) may be transmitted from one or more of the application servers 34 to the browser 12 for execution as needed.

The transmission of the web applications from the application servers 34 to the client device and browser 12 may be synchronized with playback of the media such that at least some of the related transmissions occur after the web page is loaded and/or proximate in time to execution of the related operation. The ability to time delivery of the applications to the browser to occur at some point after beginning playback of the media, e.g., upon instigation of a corresponding text track cue, may be beneficial in completing loading of the corresponding web page prior to downloading all the web applications to be executed during playback. In some cases, such as for web applications timed to occur near the beginning of the media, the web applications may be download before and/or while the web page is loading.

In this manner, the application server related communications may take place at some point after loading the web page associated with playback of the media. Rather than having to load the information from the application servers 34 and/or otherwise control the application user agent 32 while the web page is being loaded, the application user agent 32 may remain dormant until it is required to perform an action specified in one of the metadata text track cues, i.e., an action specified within one of the XML representations. This 'just-in-time' delivery of an application or other information from the application server 34 may be beneficial in closely synchronizing operations to the media and/or loading a web page without having to pre-load the information from the application server 34 prior to beginning playback of the media content. This approach also allows the present invention to deliver applications that did not exist at the time the original page was downloaded, or that which were changed since the original download, without having to re-load the page or otherwise interrupt audio/video playback.

Figure 2:
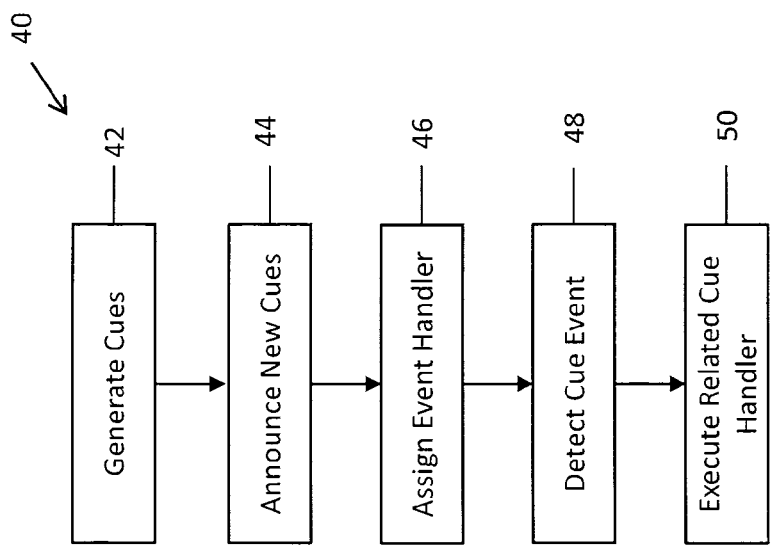
FIG. 2 illustrates a flowchart of a method for synchronizing web applications in accordance with one non-limiting aspect of the present invention.

FIG. 2 illustrates a flowchart 40 of a method for synchronizing web applications to media showing within the browser 12 in accordance with one non-limiting aspect of the present invention. The HTML5 enabled browser 12 may be associated with a computer-readable medium (not shown) having stored thereon a plurality of instructions including instructions which, when executed by a processor, cause the browse 12 to support the user agents 30, 32, and otherwise direct the control thereof to facilitate the processes contemplated by the present invention to synchronize the web-based applications to the media. While the method is predominately described with respect to in-band text track data (synchronization data) traveling with the media requiring synchronization, the present invention fully contemplates it use with non-text track dependent browsers and/or with text tracks that travel out-of-band with respect to the media.

Block 42 relates to generating the text track cues 24. The text track cues 24 may be generated by the browser 12 according to the text track related information included within the media transport stream 16. The ability to generate and organize the text track cues 24 may be a function native to an HTML5 enabled browser 12. The browser 12 may include a table or other computer-readable medium in which each of the text track cues 24 can be arranged for execution. The browser 12 may determine the order in which the text track cues 24 are timed for execution according the organization methodologies described in the above noted portions of the HTML5 specification.

The text track cues 24 associated with each of the available text track kinds (e.g., subtitles, captions, descriptions, chapters, and metadata) may be generally the same in that each of the corresponding header portions 26 may include the same type of information (e.g., the identifier, the start time, the end time, the pause-on-exit flag, the writing direction, and the size). In this manner, the mechanism used to time implement and otherwise facilitate execution of the text track cues 24 may be common across disparate operating system and independent of the associated type of text track cue 24. The text track cues 24 may be distinguished according to the payload 28 created from the text included as the text of the cue, i.e., the payloads 28 generated from the text track data may not require each text track cue 24 to include similarly formatted data.

The payloads 28 related to the subtitles, captions, descriptions, and chapters kind of text tracks may be human-understandable in that the corresponding data is written in English or another language that conveys information to humans. This may be required since the human-readable text will be displayed during playback to correspondingly display subtitles, captions, descriptions and chapter relates text. The browser 12 may be configured to execute operations pre-assigned to the kind of text track in order to facilitate display or other presentation of the human-readable text. The code, logic, programming, etc. needed to execute those operations (i.e., the machine-readable text) may not be included within the text of the corresponding text track cues, as it is native to the browser 12 and/or loaded with or prior to loading the web page.

While the metadata text track cues 24 may similarly include human-understandable text, or at least including some portion that are human-readable, the present invention contemplates the metadata text track cues 24 instead having machine-readable information. In particular, the present invention contemplates the metadata text track cues 24 having text suitable for use in directing the application user agent or other machine-controllable feature of the browser 12. The use of the metadata text track cues 24 to carry the XML or other representation of the machine-readable text is believed to be beneficial as it provides a ubiquitous means for synchronizing execution of an application with any browser, player, and client device capable of implementing HTML5, regardless of the operation system and other proprietary architectures thereof.

The machine-readable text of the metadata text track cues 24 may correspond with a type of application user agent 32 operating with the browser 12. In the case of the application user agent 32 being configured to support ETV, the text of the corresponding text tracks may be written according the ETV Enhanced TV Application Messaging Protocol 1.0 specification, OC-SP-ETV-AM1.0406-110128, OpenCable™ Specifications, as published by Cable Television Laboratories, Inc., the disclosure of which is hereby incorporated by reference in its entirety. In the case of the application user agent being configured to support dynamic advertisement insertion, the text of the corresponding text tracks may be written according to Society of Cable Telecommunications Engineers (SCTE) 35 specification, the disclosure of which is hereby incorporated by reference in its entirety.

The noted specifications are provided for illustrative purposes and to provide detail on some of the text of the cues for the metadata text track cues 24 where applications require close synchronization to playing media in order to deliver a suitable user experience, particularly with respect to facilitating browser-based media interactivity properly timed with the media playback. The present invention fully contemplates including virtually any type of machine-readable text with the metadata text track cues 24, or at least any type of machine-readable text suitable to being transported with the HTML5 defined text tracks and implementable using the text track cues. As such, the present invention is not necessarily limited to any particular method of generating the metadata text track cues. The noted XML representations, therefore, merely provide one mechanism for transmitting structured data in machine readable form and a structure suitable to identifying the type, meaning, format, and units for the associated data whereby the user agent can identify the relevant information within the XML structure and determine the characteristics of that data so that it is properly used.

Once the subtitles, metadata, and other text track cues are generated, Block 44 relates to the browser 12 announcing the newly generated text tracks to the user agents 30, 32 operating within the browser, which are shown for exemplary purposes to correspond with the native user agent 30 and the application user agent 32. As noted above, the native user agent 30 (i.e., browser user agent 30) is provided for exemplary purposes and to illustrate use of the text track cues. It may not be a user agent separate from the browser 12, i.e., it may be an element native to the browser, and therefore, would not necessary be a standalone feature as shown in FIG. 1. The announcements are made to the user agents 30, 32 in order to apprise the user agents of a new text track or the addition of a new cue to an existing text track so that the user agents 30, 32 can determine whether to associate the corresponding text track cues with their own operations.

Block 46 relates to the user agents 30, 32 assigning an event handler to the text track cues 24 of those which have been associated with their operation. Returning to FIG. 1, a first text track cue and a fourth text track cue have been assigned to the applications user agent 32 and a second text track cue and a third text track cue have been assigned to the native user agent 30. While the text track cues 24 are arranged in order and referred to with corresponding first, second, third, and fourth references, the text track cues 24 need not necessarily be arranged into any particular order. Rather, the event handler assigned thereto may be configured to retrieve the appropriate text track cue 24 upon occurrence of the corresponding text track cue events.

Block 48 relates to detecting occurrence of a text track cue event or other operation requiring execution of a corresponding one or more of the text track cues 24. The text track cue events identifying a need to act on one of the text track cues may be specified within the header 26 of each text track cue 24. The header 26 identifier associated with the start time, for example, may be used by the corresponding event handler to determine when that text track cue requires implementation. Of course, other information and organization of the text track cues 24 may be used by the event handlers to synchronize execution of corresponding ones of the text track cues 24. The ability of the event handlers to monitor various operating characteristics of the browser 12 and/or client device to identify when it is to take action and execute a certain text track cue 24 allows the corresponding user agents 30, 32 to be prompted into action a virtually any specifiable point during playback of the media.

Block 50 relates to one of the user agents executing a corresponding one of the text track cues. In the event the text track cue relates to subtitles, this may include the native user agent 30 display the subtitles within a window of the web page showing the media. In the event the text track cue 24 relates to a web application, this may include the application user agent 32 acting on the XML representation associated therewith and executing any operations specified therein. This may include the application user agent 32 instigating download of a web application, and optionally at some specified period of time or event thereafter, executing the corresponding web application. The web applications, as noted above, may be used to facilitate virtually any type of application through the web browser, such as but not limited to those associated with ETV and dynamic advertisement insertion.

As supported above, one non-limiting aspect of the present invention relates to enabling television applications, like client advertisement insertion and enhanced TV, to be used in standard web browsers. This may include a process where application signaling messages can be associated with arbitrary media streams that are delivered to a standard web browser so that the application execution is synchronized with the media playback. Optionally, the present invention includes: the use of timed tracks for enhanced television applications and client ad insertion in a web browser; a way to encode the application signaling messages to allow multiple message formats in a standard way; and a way to add the implementation of timed text tracks to an existing web browser through a web page.

One non-limiting aspect of the present invention contemplates supporting ETV applications being authored into one or more standard web pages encoded in HTML, JavaScript and Cascading Style Sheets (or converted from Enhanced Binary Interchange Format (EBIF) to this format). Optionally, this may include the web pages being pulled from the server by a browser based iTV user agent written in JavaScript such that the user agent may then be downloaded as part of a service provider's web page. This may be helpful in facilitating the use of EISS triggers sent as private data in an MPEG-2 TS (as is the case with EBIF) and/or the triggers being encoded in other transport stream formats. The browser user agent (such as WebKit and the platform player) may be extended to: extract the EISS from the media stream (in this case MPEG-2 TS); create HTML5 DOM objects representing the EISS message contents and timing information; and raise events associated with the creation of the HTML5 DOM objects it creates. The extended HTML5 DOM may raise events at the appropriate time to cause the EISS message data, encoded as an XML document, to be passed to the JavaScript iTV user agent. The iTV user agent may act on the XML messages to: pull the iTV application HTML page from the server based on a URL; start, stop or destroy the iTV application in the browser The XML message format as defined by a type field and a data field. (The type field allows an arbitrary message to be sent, identified by its type. The opaque message is carried in the data field)

One non-limiting aspect of the present invention contemplates an off the shelf browser can be dynamically extended in a client computing device to provide some of the text tracks functionality such that existing web browsers can parse HTML pages containing HTML5 <track> elements that represent the synchronous data associated with the media stream, even of the browser does not implement the text tracks function. The text tracks API module can be implemented as JavaScript which can be downloaded as part of a web page. This JavaScript can reference the parsed <track> elements, effectively adding text tracks behavior to a browser that did not have it.

One non-limiting aspect of the present invention contemplates encoding the <track> elements in the HTML page such that the iTV user agent can use HTML5 web sockets to dynamically pull the synchronous data from a web server and invoke the Timed Tracks API JavaScript module to create the text tracks representation of the synchronous messages. This allows the client to receive the synchronization data out-of-band with respect to the media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of synchronizing web applications to media playing through a web browser, the media playing within a webpage downloaded from a content server to the web browser, the web browser having a player for outputting the media to a user for viewing, the method comprising:

generating a plurality of text track cues from text track data carried within a transport stream used to transport the media to the web browser, wherein a first text track cue of the plurality of the text track cues specifies a universal resource locator (URL) for a web application to be implemented upon occurrence of a first triggering event, the first triggering event occurring after the web browser downloads the webpage and begins playing the media;

downloading the web application to the web browser from an application server after occurrence of the first triggering event, the web application being downloaded using the URL through signaling separate from the transport stream;

a second text track cue of the plurality of text track cues sufficient for specifying subtitles to be displayed within the webpage during media play upon occurrence of a second triggering event, the second triggering event occurring prior to the first triggering event, the browser including a native user agent to display the subtitles and an application user agent to implement the web application;

a third text track cue of the plurality of text track cues sufficient for specifying captions to be displayed within the webpage during media play upon occurrence of a third triggering event, the third triggering event occurring prior to the first triggering event, the browser including the native user agent to display the captions, the application user agent being dormant until the native user agent displays the captions;

a fourth text track cue of the plurality of text track cues sufficient for specifying descriptions to be displayed within the webpage during media play upon occurrence of a fourth triggering event, the fourth triggering event occurring prior to the first triggering event, the browser including the native user agent to display the descriptions; and a fifth text track cue of the plurality of text track cues sufficient for specifying chapters to be displayed within the webpage during media play upon occurrence of a fifth triggering event, the fifth triggering event occurring prior to the first triggering event, the browser including the native user agent to display the chapters.

2. The method of claim 1 further comprising determining the URL from machine-readable text and the chapters from human- readable text, the URL and chapters being identified within a payload of the correspond first and second text track cues, a header of the first and fifth text track cues specifying timing for the corresponding first and fifth triggering events.

3. The method of claim 1 further comprising identifying the URL from within a payload of the first text track cue.

4. The method of claim 3, further comprising determining instructions for downloading the web application to the web browser from a machine-readable portion of the payload.

5. The method of claim 3, further identifying the first triggering event from within a header of the first text track cue.

6. The method of claim 1, further comprising downloading the web application from the application server after the application server generates the web application, the application server generating the web application after the web browser begins playing the media, the web application being one of non-existent at the application server when the web browser began playing the media and changed since the web browser began playing the media.

7. The method of claim 1 further comprising implementing the downloaded web application without re-loading the webpage.

8. A non-transitory computer-readable medium having a plurality of instructions including instructions which, when executed by a processor operating in cooperation with a web browser, cause the web browser to facilitate synchronizing web applications to media playing through the web browser, the media playing within a webpage downloaded from a content server to the web browser, the web browser having a player, a native user agent and an application user agent, the non-transitory computer-readable medium comprising instructions sufficient for:
  generating a plurality of text track cues from text track data carried within a transport stream used to transport the media to the web browser, wherein:
  i. a first text track cue of the plurality of the text track cues sufficient for specifies a universal resource locator (URL) for a web application to be implemented with the application user agent upon occurrence of a first triggering event, the first triggering event occurring after the web browser downloads the webpage and the player begins playing the media;
  ii. a second text track cue of the plurality of text track cues sufficient for specifying subtitles for the native user agent to display within the webpage during media play upon occurrence of a second triggering event, the second triggering event occurring prior to the first triggering event;
  iii. a third text track cue of the plurality of text track cues sufficient for specifying captions for the native user agent to display within the webpage during media play upon occurrence of a third triggering event, the third triggering event occurring prior to the first triggering event;
  iv. a fourth text track cue of the plurality of text track cues sufficient for specifying descriptions for the native user agent to display within the webpage during media play upon occurrence of a fourth triggering event, the fourth triggering event occurring prior to the first triggering event; and
  v. a fifth text track cue of the plurality of text track cues sufficient for specifying chapters for the native user agent to display within the webpage during media play upon occurrence of a fifth triggering event, the fifth triggering event occurring prior to the first triggering event; and
  downloading the web application to the web browser from an application server after occurrence of the first triggering event using the URL 9. The non-transitory computer-readable medium of claim 8, further comprising instructions sufficient determining the URL from machine-readable text and the chapters from human-readable text, the URL and chapters being identified within a payload of the correspond first and second text track cues, a header of the first and fifth text track cues specifying timing for the corresponding first and fifth triggering events.

10. The non-transitory computer-readable medium of claim 8, further comprising instructions sufficient identifying the URL from within a payload of the first text track cue.

11. The non-transitory computer-readable medium of claim 10, further comprising instructions sufficient determining instructions for downloading the web application to the web browser from a machine-readable portion of the payload 12. The non-transitory computer-readable medium of claim 10, further comprising instructions sufficient identifying the first triggering event from within a header of the first text track cue.

13. The non-transitory computer-readable medium of claim 8, further comprising instructions sufficient downloading the web application from the application server after the application server generates the web application, the application server generating the web application after the web browser begins playing the media, the web application being one of non-existent at the application server when the web browser began playing the media and changed since the web browser began playing the media.

14. The non-transitory computer-readable medium of claim 8, further comprising instructions sufficient implementing the downloaded web application without re-loading the webpage.

15. A non-transitory computer-readable medium having a plurality of instructions including instructions which, when executed by a processor operating in cooperation with a content server cause a web browser to facilitate synchronizing web applications to media playing through the web browser, the media playing within a webpage downloaded from the content server to the web browser, the web browser having a player, a native user agent and an application user agent, the non-transitory computer-readable medium comprising instructions sufficient for:
  generating text track data for use with the web browser to generate a plurality of text track cues, the text track data being transported within a transport stream used to transport the media to the web browser, the text track data being sufficient for generating:
  i. a first text track cue sufficient for specifying a universal resource locator (URL) for a web application to be implemented with the application user agent upon occurrence of a first triggering event, the first triggering event occurring after the web browser downloads the webpage and the player begins playing the media;
  ii. a second text track cue sufficient for specifying subtitles for the native user agent to display within the webpage during media play upon occurrence of a second triggering event, the second triggering event occurring prior to the first triggering event;

iii. a third text track cue sufficient for specifying captions for the native user agent to display within the webpage during media play upon occurrence of a third triggering event, the third triggering event occurring prior to the first triggering event;

iv. a fourth text track cue sufficient for specifying descriptions for the native user agent to display within the webpage during media play upon occurrence of a fourth triggering event, the fourth triggering event occurring prior to the first triggering event; and v. a fifth text track cue sufficient for specifying chapters for the native user agent to display within the webpage during media play upon occurrence of a fifth triggering event, the fifth triggering event occurring prior to the first triggering event; and wherein the web browser downloads the web application from an application server after occurrence of the first triggering event using the URL.

16. The non-transitory computer-readable medium of claim 8, further comprising instructions sufficient identifying the URL within machine-readable text and the chapters within human-readable text, the URL and chapters being identified within a payload of the correspond first and second text track cues, a header of the first and fifth text track cues specifying timing for the corresponding first and fifth triggering events.

17. The non-transitory computer-readable medium of claim 8, further comprising instructions sufficient identifying the URL from within a payload of the first text track cue.

18. The non-transitory computer-readable medium of claim 10, further comprising instructions sufficient determining instructions for downloading the web application to the web browser from a machine-readable portion of the payload and instructions sufficient identifying the first triggering event within a header of the first text track cue.

19. The non-transitory computer-readable medium of claim 8, further comprising instructions sufficient instructing downloading of the web application from the application server after the application server generates the web application, the application server generating the web application after the web browser begins playing the media, the web application being one of non-existent at the application server when the web browser began playing the media and changed since the web browser began playing the media.

20. The non-transitory computer-readable medium of claim 8, further comprising instructions sufficient implementing the downloaded web application without re-loading the webpage.

* * * * *